No. 755,512. PATENTED MAR. 22, 1904.
C. MAPLES.
NECK YOKE.
APPLICATION FILED JUNE 15, 1903.
NO MODEL.
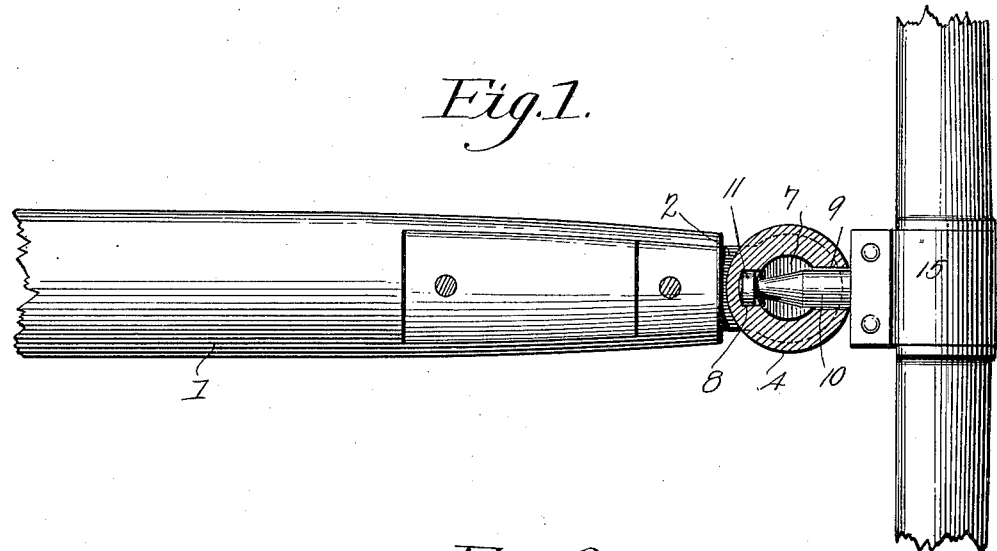
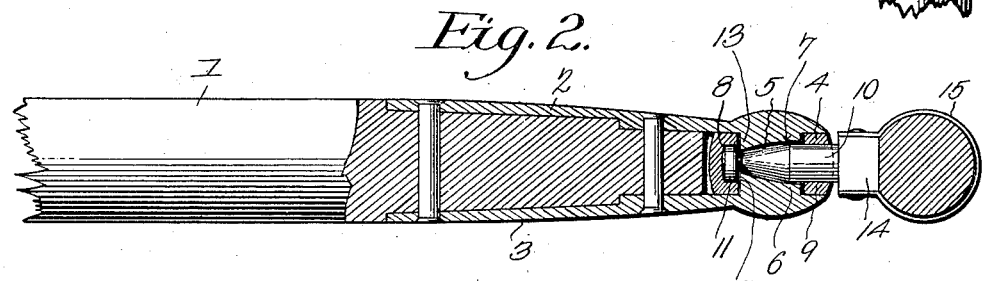
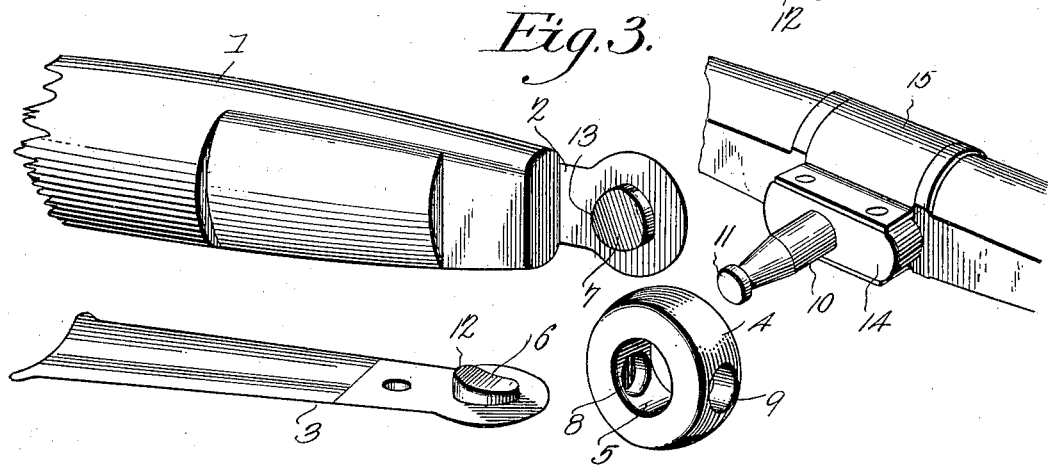
Witnesses
Cassius Maples, Inventor:
by C. A. Snow & Co.
Attorneys No. 755,512. Patented March 22, 1904.

UNITED STATES PATENT OFFICE.

CASSIUS MAPLES, OF LAURENS, NEW YORK.

NECK-YOKE.

SPECIFICATION forming part of Letters Patent No. 755,512, dated March 22, 1904.

Application filed June 15, 1903. Serial No. 161,590. (No model.)

*To all whom it may concern:*

Be it known that I, CASSIUS MAPLES, a citizen of the United States, residing at Laurens, in the county of Otsego and State of New York, have invented a new and useful Neck-Yoke, of which the following is a specification.

This invention relates to neck-yokes; and one of the principal objects sought to be attained is to provide means whereby the neck-yoke will be capable of turning in all directions and at the same time be securely held connected to the vehicle-tongue.

Another object of the invention is to provide means whereby the yoke can be detached from the tongue.

Further objects and advantages of this invention will appear in the following description, and the novel features thereof will be particularly pointed out in the appended claims, it being understood that various changes in the form, proportion, and the minor details of construction may be resorted to without departing from the spirit or sacrificing any of the advantages of this invention.

In the drawings, Figure 1 is a view of a pole and neck-yoke, the connection being illustrated in section. Fig. 2 is a vertical longitudinal sectional view of a pole, neck-yoke, and the fastening means therefor. Fig. 3 is a fragmentary detail view of the several parts of which the invention consists.

The pole 1 carries oppositely-disposed terminal supporting and clamping devices 2 and 3, interposed between which is a rotating socket member 4, which in the present instance comprises a ring provided with a concentric bore 5, sleeved upon the oppositely-located journal projections 6 and 7, carried by the respective supporting devices and upon which the ring is free to turn. A socket 8 is formed in the inner wall of the ring and alines with an opening 9 in said ring, through which projects a stud or headed pin 10, the head 11 of which rests in the socket 8, in which it is normally held by the engaging terminals 12 and 13 of the journal projections 6 and 7 on the supporting devices 2 and 3. This stud or pin 10 is rigid with the neck-yoke, and in actual practice it can be screwed into the neck-yoke or formed on a base 14 and fastened to the neck-yoke by a band 15.

The terminal-engaging portions of the journal projections 6 and 7 are somewhat reduced to provide sharp engaging ends for the reduced portion 16 of the pin 10 adjacent to the head 11 and to permit the pin to freely swing within the ring on one plane, while the ring is permitted to swing in a plane at right angles to the swing of the pin.

The arrangement above described will permit the neck-yoke to move in substantially any position to relieve any strain to which the draft-animal would be subjected in drawing the vehicle.

In actual practice the end of the tongue will be reduced by cutting away from the sides, and by countersinking the devices 2 and 3 a finished even appearance will be presented. The flanges 17 and 18 of the respective supporting devices 2 and 3 will be instrumental in keeping dust, dirt, or any other foreign matter from entering the interior of the ring and disturbing the proper operation of the several parts.

I claim—

1. In a connecting means for a pair of draft members, a stud carried by one member, clamping means carried by the second member, and an intervening member free for rotative movement with respect to both the clamping means and the stud.

2. In a connecting means for a pair of draft members, a rigid part carried by one member, a ring pivoted on the rigid part, and clamping means on the second member and directly engaging the ring and the rigid part.

3. In a connecting means for draft members, a rigid device carried by one member, rigid clamping means on the second member, and an intervening member engaged by the clamping means and free for rotative movement with respect to both the rigid device and the clamping means.

4. In a connecting means for a pair of draft members, a stud carried by one member, clamps carried by the second member, and having journals, a ring pivoted on the stud and rotatable on the journals.

5. In a connecting means for draft members, a headed stud carried by one member, clamps on the second member, and provided with journals, an interposed ring engaged by journals and through which the stud projects for engagement by the journals.

6. In a connecting means for draft members, a stud on one member, clamping devices on the second member and provided with projections having sharp terminals, and a ring on the projections, through which the head projects for the engagement of the terminals with the stud adjacent to the head.

7. In a connecting means for draft members, a stud on one member, a pair of clamps on the second member, and having inwardly-disposed projections, and a ring on the projections and having an opening and an alining socket for the stud.

8. In a connecting means for draft members, a stud on one member, a ring having an opening and an alining socket, for the reception of the stud and clamps on the second member engaging the ring and the stud.

9. In a connecting means for draft members, a stud on one member, a ring having an opening and an alining socket for the reception of the stud and clamps on the second member engaging the ring and the stud but permitting free rotative movement of the ring and the stud.

In testimony that I claim the foregoing as my own I have hereto affixed my signature in the presence of two witnesses.

CASSIUS MAPLES.

Witnesses:
CHARLES TAYLOR,
D. S. VEST.